Patented Apr. 12, 1932

1,853,462

UNITED STATES PATENT OFFICE

MAXIMILIAN PAUL SCHMIDT AND WILHELM KRIEGER, OF WIESBADEN-BIEBRICH, GERMANY, ASSIGNORS TO KALLE & CO., AKTIENGESELLSCHAFT, OF WIESBADEN-BIEBRICH, GERMANY, A CORPORATION OF GERMANY

DIAZO-TYPES AND PROCESS OF MAKING THE SAME

No Drawing. Application filed November 8, 1927, Serial No. 231,988, and in Germany November 12, 1926.

The present invention relates to diazotypes containing a titanium salt and process of preparing them, or more particularly to light sensitive layers containing a titanium salt and process of making them.

In U. S. Patent No. 1,444,469 of February 6, 1923, to Gustav Kögel and Heinrich Neuenhaus is disclosed a process for preparing light-sensitive layers by applying upon paper, films glass or any other base a diazo-compound, for instance a diazo-naphtholsulfonic acid together with an azo component (resorcinol or the like) and a metal salt, the said layers being particularly suitable for the preparation of photographic pictures. It has also been proposed already to treat diazotypes, prepared without the use of a metal salt, subsequently with a solution of a metal salt in order to render them more stable.

In most cases, however, pictures which are produced by the dyestuffs forming lakes with the metal salts, exhibit glaring tones which are unsatisfactory for photographic purposes. By using iron or manganese salts brown and black tints are obtained, but the pictures so produced are not very stable and their ground tone is rather impure.

Now we have found, that by using titanium salts neutral brown to black tints can be obtained which are particularly useful for photographic purposes, for instance for producing films. The tones are, of course, largely dependent on the diazo-compound and the azo component used. They may also be modified by an after-treatment with another metal salt, and thus any gradation of the tone may be obtained.

We have even found that by the mere action of a small amount of moisture, preferably with heat, for instance by employing steam, upon the pictures, after they have been developed with ammonia gas, the tone can be largely modified, for instance by passing a sponge over the pictures or by exposing them to moist air. In this manner, a range of shades from yellowish-brown to black can be produced without the pictures losing their brilliancy. By regulating the duration of the action of the moisture it is possible to obtain exactly the tone desired. In the said treatment the copies hardly become wet, so that no prolonged drying process is required.

As titanium salts there are preferably used complex titanium salts, i. e., compounds obtained by combining titanium salts with other salts, for instance, titanic potassium oxalate or titano ammoniumfluoride.

The following examples serve to illustrate our invention, but they are not intended to limit it thereto; all parts being parts by weight:

(1) Photographic baryta-paper, for instance, is covered or impregnated with a solution containing in 100 parts of water: 2.5 parts of 1.2.4-diazonaphtholsulfonic acid, 2 parts of dichloro-resorcinol, 4 parts of titanium potassium oxalate.

After drying, the paper is exposed to light under a positive and developed with ammonia. After expelling the ammonia and, if required, treating with water, yellowish-brown copies are obtained.

In order to obtain a darker tone, the copies are placed for 1-2 minutes into a dilute solution of copper sulfate. The tone of the picture thereby changes to a reddish-brown. If it is desired to obtain a blackish-brown tone, the copy is first treated with water for a short time before it is placed into the copper sulfate bath.

(2) A cellulose film is impregnated with a solution containing in 1000 parts of water: 9 parts of sodium 2.1-diazonaphthol-4-sulfonate, 1.8 parts of phloroglucin, 24 parts of titanium potassium oxalate. After having exposed the film to light under a positive and developing with gaseous ammonia, a violet copy is obtained which on exposure to the air assumes a neutral brownish-black tone. This transition of the tone can be accelerated by moistening the film with water vapor, if required at an elevated temperature.

(3) Ordinary paper is covered with a solution containing in 1000 parts of water: 15 parts of sodium 2.1-diazonaphthol-4-sulfonate, 3 parts of phloroglucin, 20 parts of titanium-ammoniumfluoride. After exposing and developing with ammonia, a violet-colored positive is obtained, which after evaporation of the ammonia assumes a neutral black tone.

(4) A light-sensitive paper prepared according to Example 1 by means of 1-diazo-2-naphthol-4-sulfonic acid, dichloro-resorcinol and titanium potassium oxalate, is exposed to light under a positive and developed with gaseous ammonia. The yellowish-brown copy obtained after expelling the ammonia is exposed for a short time to the action of a weak current of water vapor whereupon the copy assumes a neutral dark-brown tone. If the modification of the tone of the copy is not produced by means of water vapor, but if the copy is moistened with a sponge, it assumes a blackish-brown tone.

(5) A mixture consisting of 5 parts of the sodium salt of 1-diazo-2-naphthol-4-sulfonic acid, 4 parts of dichloro-resorcinol, 10 parts of titanium potassium oxalate, 100 parts of gelatin and 1000 parts of water, is applied to unprepared photographic paper, whereupon the paper is exposed to light under a pattern and developed with ammonia gas. The copy thus prepared is then exposed to moist air. By modifying the degree of moisture and the duration of its action, it is possible to obtain copies showing the whole scale of tones extending from yellowish-brown through neutral brown to brownish-black.

If another diazo-compound or another azo-dye component than the above named are used, the tone is somewhat altered, but also in this case any gradation of tone can be obtained.

In the preceding examples it has been described to add the titanium salt to a light-sensitive layer containing a diazo-compound and an azo dyestuff component. It is also possible to add the titanium salt to a light-sensitive layer which only contains a diazo-compound, to expose the layer thus produced to light and to develop the picture by means of an azo dyestuff component.

We claim:

1. The process of making diazotypes, which consists in applying a diazo-compound and an azo dyestuff component together with a titanium salt on a suitable base, exposing the layer thus produced to light under a picture and developing the so exposed copy with an alkaline-reacting agent.

2. The process of making diazotypes, which consists in applying a diazo-compound and an azo dyestuff component together with a titanium salt on a suitable base, exposing the layer thus produced to light under a picture and developing the so exposed copy with an alkaline-reacting gas.

3. As new products, sensitive layers on a suitable base consisting of a diazo-compound, an azo dyestuff component, and a titanium salt.

4. As new products, sensitive layers on a suitable base consisting of a diazo compound, an azo dyestuff component and a complex salt of titanium.

5. As new products, sensitive layers on a suitable base consisting of a diazo compound, an azo dyestuff component and a complex salt of tetravalent titanium.

6. As new products, sensitive layers on a suitable base consisting of a diazo compound, an azo dyestuff component and titano-ammoniumfluoride.

7. In the process of making light sensitive layers by means of a diazo-compound, the step which comprises adding a titanium salt to the layer.

8. In the process of making light sensitive layers by means of a diazo-compound, the step which comprises adding a complex salt of titanium to the layer.

9. In the process of making light sensitive layers by means of a diazo-compound, the step which comprises adding a complex salt of tetravalent titanium to the layer.

10. In the process of making light sensitive layers by means of a diazo-compound, the step which comprises adding titano-ammoniumfluoride to the layer.

In testimony whereof, we affix our signatures.

MAXIMILIAN PAUL SCHMIDT.
WILHELM KRIEGER.